Nov. 24, 1970      R. W. JOHNSTON      3,543,131
POWER SUPPLY SYSTEM

Original Filed Oct. 27, 1966      4 Sheets-Sheet 1

INVENTOR.
Richard W. Johnston
BY
C. R. Meland
ATTORNEY

INVENTOR.
Richard W. Johnston
BY
C. L. Meland
ATTORNEY

United States Patent Office 3,543,131
Patented Nov. 24, 1970

3,543,131
POWER SUPPLY SYSTEM
Richard W. Johnston, Troy, Mich., assignor to General Motors Corporation, Detroit, Mich., a corporation of Delaware
Original application Oct. 27, 1966, Ser. No. 589,928, now Patent No. 3,477,002, dated Nov. 4, 1969. Divided and this application Nov. 26, 1968, Ser. No. 779,018
Int. Cl. H02m 7/52; H02p 5/40
U.S. Cl. 321—5
4 Claims

ABSTRACT OF THE DISCLOSURE

A power supply system for feeding a polyphase electrical load, such as an induction motor, from a source of direct current through an inverter. The inverter is comprised of a plurality of controlled rectifiers and pairs of controlled rectifiers are gated conductive to sequentially connect pairs of phase windings of the induction motor across the source of direct current to control the frequency of the current supplied to the motor. One of the controlled rectifiers of the pair of controlled rectifiers is pulsed on and off during a given conduction period to control the voltage applied to the motor. This controlled rectifier is the one of the pair that is the last to conduct in a given conduction period to insure positive turn-off of the controlled rectifiers at the end of a conduction period. The inverter includes shut-off controlled rectifiers for connecting a commutating capacitor with a conducting power controlled rectifier to turn it off.

---

This application is a division of copending patent application Ser. No. 589,928, filed on Oct. 27, 1966 now patent No. 3,477,002.

This invention relates to a power supply system and more particularly to a power supply system for controlling the average voltage applied to an electrical load such as an electric motor.

In motor control systems of the type shown in patent application Ser. No. 295,954, filed on July 18, 1963, now Patent No. 3,323,032, and assigned to the assignee of this invention, an induction motor is supplied with a variable frequency current from an inverter. The slip frequency of the induction motor is controlled by adding a slip frequency signal to a signal which is proportional to the speed of the motor and then triggering the inverter by a summation of these signals. With this arrangement, the slip frequency of the induction motor can be controlled or, if desired, held constant. In order to control torque, it is desirable to have a system which not only can control the slip frequency of the motor but which is also capable of controlling the voltage applied to the motor.

One arrangement for controlling the average voltage applied to the motor that is fed by an inverter is disclosed in the above-mentioned patent and in patent application, Ser. No. 457,374, filed on May 20, 1965, now abandoned, and assigned to the assignee of this invention. In the system of application Ser. No. 457,374, a pulse modulator is connected between the voltage source and the inverter and this modulator serves to control the average voltage applied to the windings of the induction motor. In contrast to a system that controls voltage applied to the motor by some device in addition to the inverter, it is an object of this invention to provide an inverter for feeding the motor which is capable of controlling the frequency and voltage of the power applied to the induction motor. In carrying this object forward, an inverter is provided which has a plurality of semiconductor switching devices and the arrangement is such that the switching devices are triggered by logic information to control the frequency of the current supplied to the motor and are also triggered by logic information to control the voltage applied to the motor. This is preferably accomplished by controlling the "on" time of the semiconductor switches once they are gated to a conductive condition by the frequency determining information.

Another object of this invention is to provide an inverter for feeding a load such as a motor that is capable of controlling the frequency and magnitude of the current supplied to the motor and an inverter which permits current to flow through the motor windings after the inverter disconnects the power source and the windings. With this arrangement, a large peak voltage can be applied from the source of voltage to the motor for a short time and the stored energy can be averaged over a long period of time.

Another object of this invention is to provide an inverter which is capable of transforming direct current into a variable frequency alternating current and which utilizes controlled rectifiers as the switching elements and further where a single commutating capacitor is utilized to turn off conductive controlled rectifiers in an arrangement where the inverter is capable of controlling both the magnitude and the frequency of its output current.

Another object of this invention is to provide a motor power supply system for an induction motor where the average input voltage level to the induction motor is controlled by an inverter and where the logic information for controlling the inverter can automatically maintain a desired speed-torque curve for the induction motor with varying voltage of the power supply.

A further object of this invention is to provide an inverter comprised of semiconductor switching elements such as controlled rectifiers which serve to provide a polyphase output current from a source of direct current and where the frequency of the output current is determined by the frequency of a series of timing pulses which are preferably spaced by 60°. In carrying this object forward, the 60° timing pulses are utilized to generate the fundamental polyphase output current for the motor and additional delayed pulses are utilized to shut off the controlled rectifiers at predetermined intervals so as to control the average output voltage of the inverter. With this arrangement, power is supplied to the motor over 120° intervals and these intervals can be broken up into discrete pulses of varying frequency and pulse width to control the power applied to the motor within the inverter.

Further objects and advantages of the present invention will be apparent from the following description, reference being had to the accompanying drawings wherein preferred embodiments of the present invention are clearly shown.

Figure 1:
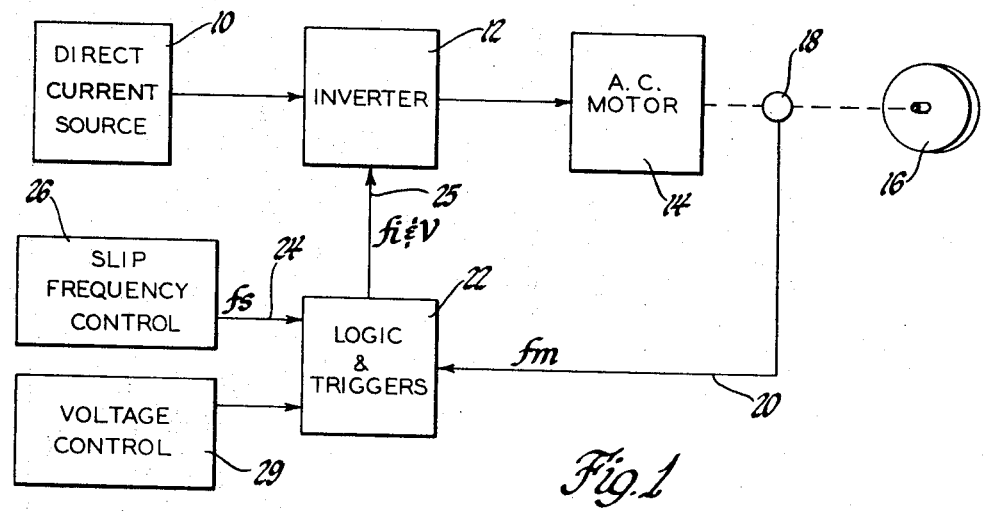
FIG. 1 is a block diagram of a motor power supply system utilizing an inverter made in accordance with this invention.
Figure 2:
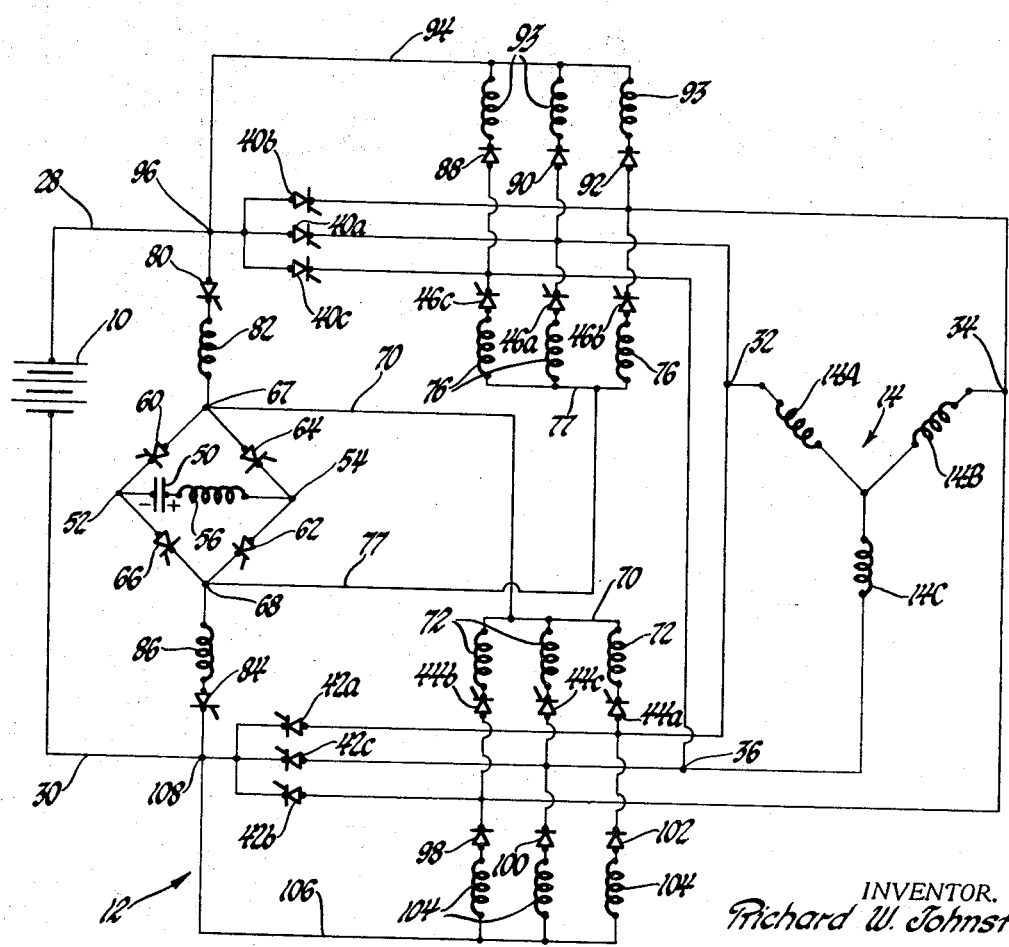
FIG. 2 is a schematic circuit diagram of an inverter made in accordance with this invention shown connected with a three phase induction motor.

Referring now to the drawings and more particularly to FIG. 1, the reference numeral 10 designates a source of direct current which, for example, can be a battery or a fuel cell or could be provided by the rectified output of an alternating current generator. The source of direct current 10 is connected with an inverter 12 which is shown schematically in FIG. 2 and the inverter supplies current to a polyphase induction motor 14 the phase windings of which are shown in FIG. 2. The induction motor 14 drives a load 16 which has been illustrated as the wheel of a motor vehicle.

A signal generating device 18 which can take various forms is driven by the shaft of the motor 14 and develops a motor speed signal $f_m$ on line 20 which is a function of the speed of the rotor of the induction motor 14.

Figure 3:
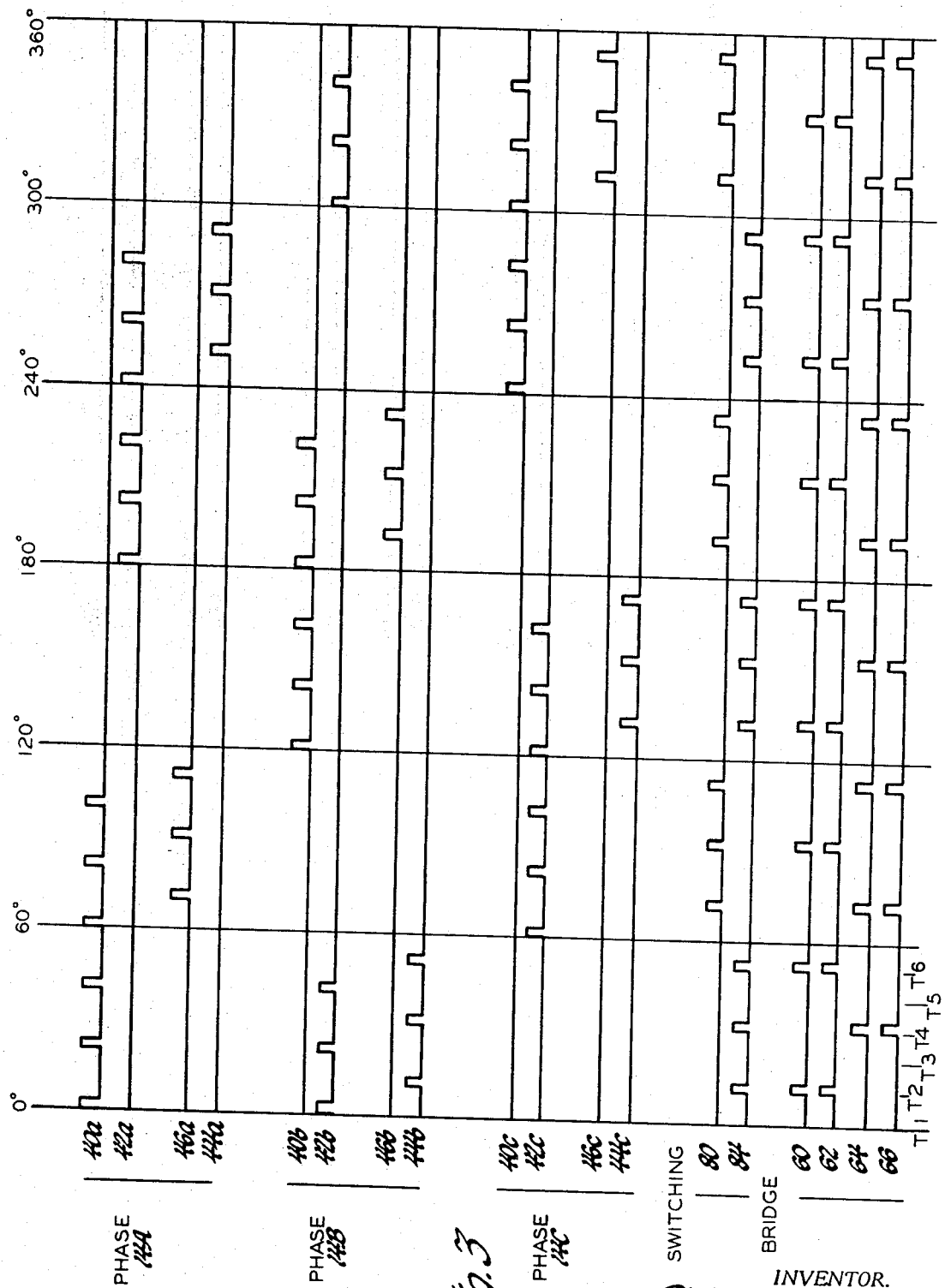
FIG. 3 is a diagram of the pulse information supplied to the controlled rectifiers of the inverter shown in FIG. 2 at various instants of time.

The line 20 is connected with a logic system 22, the output of which controls the inverter 12. This logic system can take various forms and can be of the type disclosed in copending patent application, Ser. No. 589,927, filed on Oct. 27, 1966 and now patent 3,477,002. The signal information provided to the inverter 12 is illustrated in FIG. 3 and will be more fully described hereinafter. The logic system 22 adds a motor speed signal $f_m$ coming from line 20 to a slip frequency signal $f_s$ applied to the logic system through line 24 from a slip frequency control 26. The logic information that is fed to the inverter 12 through line 25 will therefore include a signal $f_1$ which is equal to a summation of $f_s$ and $f_m$. The signal $f_s$ programs the slip frequency of the induction motor 14 and with the arrangement just described, the slip frequency of the current supplied to the motor 14 will be set at a value determined by the slip frequency control 26. The output current supplied by the inverter 12 to the induction motor 14 will have a fundamental frequency determined by motor speed signal $f_m$ and the slip frequency signal $f_s$ and this output current is capable of being modulated both as to pulse width and pulse frequency as is more fully described hereinafter.

The signal applied to the inverter 12 from line 25 also includes voltage control information designated by the letter V which controls the average output voltage of the inverter as is more fully described hereinafter. This voltage control information is controlled by a voltage control 29 connected with the logic and trigger system 22 and the arrangement is such that by adjustment of the voltage control 29, it is possible to control the average output voltage of the inverter 12.

From the foregoing, it is seen that the inverter 12 is controlled both as to output frequency and as to average output voltage and this is more fully described hereinafter. The pulses applied to the inverter from line 25 are depicted in FIG. 3 and are fully described hereinafter in describing the operation of the inverter shown in FIG. 2.

Referring now to FIG. 2, the inverter 12 includes power supply conductors 28 and 30 which are connected with the source of direct current 10. The phase windings of the induction motor are designated by reference numerals 14A, 14B and 14C and are connected as a three-phase, Y-connected winding. The phase windings are connected respectively to junctions 32, 34 and 36.

The junction 32 is connected with the cathode of a controlled rectifier 40a, with the anode of controlled rectifier 42a, with the anode of controlled rectifier 44a and with the cathode of controlled rectifier 46a. Similar connections can be traced for the connection of junction 34 with controlled rectifiers 40b, 42b, 44b and 46b while junction 36 is connected with controlled rectifiers 40c, 42c, 44c and 46c.

The controlled rectifiers 40a, 40b and 40c together with controlled rectifiers 42a, 42b and 42c provide paths for current to be supplied to the phase windings of the induction motor 14 and hereinafter will be called power controlled rectifiers. One example of a power path is where controlled rectifiers 40a and 42c are triggered to a conductive condition and during this condition, the phase windings 14A and 14C are connected across the power input conductors 28 and 30.

The inverter of this invention has a single commutating capacitor which is designated by reference numeral 50. One end of this commutating capacitor is connected to junction 52 and the opposite end is connected with junction 54 through an inductor 56. A plurality of "bridge" controlled rectifiers 60, 62, 64 and 66 are provided which are connected in a bridge circuit with the commutating capacitor and inductor. This bridge circuit includes junctions 67 and 68, the juntion 67 being connected to a conductor 70 which is connected with the cathodes of controlled rectifiers 44a, 44b and 44c through chokes 72. The junction 68 is connected with the anodes of controlled rectifiers 46a, 46b and 46c through chokes 76 at conductor 77.

A "switching" controlled rectifier 80 and choke coil 82 are connected between power input conductor 28 and junction 67 and another switching controlled rectifier 84 and choke coil 86 are connected between junction 68 and the power input conductor 30.

The inverter has a plurality of diodes 88, 90 and 92 which are connected between the controlled rectifiers 46a–46c and a conductor 94 through choke coil 93. The conductor 94 is connected to the power input conductor 28 at junction 96. In a similar fashion, diodes 98, 100 and 102 are connected between choke coils 104 and the controlled rectifiers 44a–44c. The choke coils are connected with conductor 106 which in turn is connected to the power input conductor 30 at junction 108.

The controlled rectifiers 46a–46c and 44a–44c will be referred to hereinafter as shut-off controlled rectifiers since they operate to provide a path for the discharging of commutating capacitor 50 when it is desired to turn off one of the power controlled rectifiers.

The controlled rectifiers 60–66 are referred to as "bridge" controlled rectifiers and are used in pairs as will be more fully described hereinafter and are used in conjunction with the shut-off controlled rectifiers to turn off a given power control rectifier.

The controlled rectifiers 80 and 84 can be termed "switching" controlled rectifiers and are utilized to direct the commutation shut-off pulse to the proper controlled rectifier as is more fully described hereinafter.

The diodes 80–92 and 98–102 are reactive current diodes and their function will be described more fully hereinafter.

Before a complete description of the operation of the inverter shown in FIG. 2, it is pointed out that the function of the inverter is to control the frequency of the current supplied to the phase windings of the motor as a function of motor speed $f_m$ and slip frequency $f_s$ and to also control the duration and frequency of the pulses of current supplied to the phase windings during a cycle of operation to control the average voltage applied to the motor. During this cycle of operation, the power controlled rectifiers 40a–40c and 42a–42c are turned on and off in a predetermined sequence to provide the fundamental frequency of the current supplied to the motor and to also control the average voltage supplied to the motor by either a pulse width or pulse frequency modulation.

When the system is initially started, the controlled rectifiers of the inverter are triggered in a priming mode in order to completely charge the commutating capacitor 50. As an example of this priming mode, controlled rectifiers 80, 60, 62, 46a and 42c are simultaneously gated to a conductive condition by applying gate signals to the gate and cathode electrodes of these controlled rectifiers from the logic system 22. The capacitor 50 will then be charged from a circuit that can be traced from conductor 28, through controlled rectifier 80, through inductor 82, through controlled rectifier 60, through capacitor 50 and inductor 56, through controlled rectifier 62, through inductor 76 and controlled rectifier 46a, through phase windings 14A and 14C and then through controlled rectifier 42c to power input conductor 30. This sequence is repeated through a complete cycle of operation so that all of the phase windings of the motor 14 are energized during the charging of the capacitor 50. The current is periodically alternately reversed through capacitor 50 by at times triggering other groups of controlled rectifiers including controlled rectifiers 64 and 66.

After the capacitor has been charged by the priming mode, the system is ready for operation and this operation will be described in conjunction with the pulse diagram of FIG. 3. This pulse diagram indicates the sequence of pulses applied across the gate and cathode of a respective controlled rectifier from the logic system 22 at predetermined instants of time.

Figure 4:
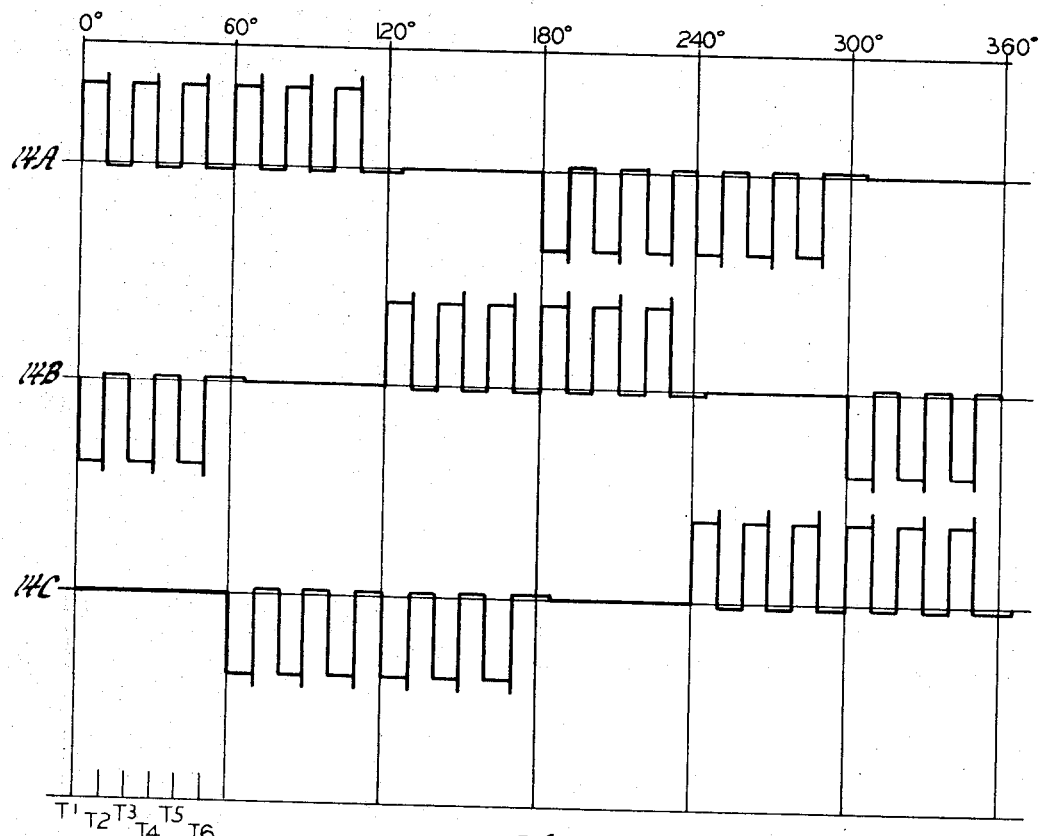
FIG. 4 illustrates the phase voltages of the phase windings of the motor shown in FIG. 2 during operation of the power supply system and when the inverter is supplied with the trigger information shown in FIG. 3.

The logic system 22 controls both the frequency and average voltage of the power supplied to the induction motor. This system utilizes a basic pulse frequency as depicted in FIG. 4 where the pulses are spaced by 60°. The arrangement is such that each phase winding of the motor is energized for 120° with positive and negative current as is depicted in FIG. 4 and at each 60° interval, a switching action occurs which deenergizes one phase of the motor and energizes another. As an example, at the end of the first 60° period shown in FIG. 4, the current is switched from phase 14B to 14C. At the 120° interval, current is switched from phase 14C in a negative direction to phase 14B in a positive direction and this sequence of switching phases at each 60° interval continues for one complete cycle of 360° whereupon the sequence is repeated. It can be seen from FIG. 4 that a given phase is energized for 120° with positive current, is deenergized for 60° and is then energized for 120° with negative current during one complete cycle of 360°.

The fundamental frequency of the current is controlled by controlling the frequency of the 60° intervals that occur over a given period of time. This is controlled in the system by the addition of the slip frequency signal $f_s$ and the motor speed signal $f_m$. During a given 60° period, however, the average voltage applied to the motor is also controlled as is shown in FIG. 4 where it is seen that three pulses of voltage have been applied during a given 60° period. The frequency of these pulses and their pulse width during a given 60° period is controlled by the logic system 22 and this arrangement will now be described with regard to the pulse diagram of FIG. 3 and the schematic circuit diagram of FIG. 2.

Before describing the operation of the system shown in FIG. 2, it is to be understood that the pulse diagram of FIG. 3 indicates pulses of voltage which are applied across the gate and cathode electrodes of the controlled rectifiers listed on FIG. 3 and shown in FIG. 2 at predetermined instants of time. This means that when a pulse of voltage exists, the particular listed controlled rectifier is gated conductive.

At time $T_1$ in FIG. 3, controlled rectifiers 40a and 42b are gated conductive and current can now flow from line 28, through conductive controlled rectifier 40a, through phase windings 14A and 14B and then through controlled rectifier 42b to the input power line 30. The phase windings 14A and 14B will be energized for the period of time indicated in FIG. 4 and in order to control the average voltage applied to the motor, the circuit including phase windings 14A and 14B is switched off before the end of the first 60° period and in fact this circuit is switched on and off three times as is indicated in FIG. 4. In order to accomplish this switching off of the circuit that includes phase windings 14A and 14B, a series of controlled rectifiers are triggered to a conductive condition at time $T_2$ illustrated in FIG. 3. Thus, controlled rectifiers 44b, 84, 60 and 62 are gated conductive to form the first turn-off event for the phase windings 14A and 14B. When these controlled rectifiers are gated conductive, a series of events is set up which now will be described.

When the above-mentioned series of controlled rectifiers are gated conductive, an alternate path is provided for supplying current to phase windings 14A and 14B. This path can be traced from line 28, through controlled rectifier 40a, through junction 32, through phase windings 14A and 14B to junction 34, through controlled rectifier 44b, through controlled rectifier 60, through capacitor 50, through inductor 56, through controlled rectifier 62, through inductor 86, and then through controlled rectifier 84 to the opposite side of the power source 10. Assuming that the capacitor 50 was charged to a polarity indicated in FIG. 2, it will be appreciated that the voltage of the capacitor and the power source are now effectively connected in series and the capacitor will begin to discharge.

The next event that occurs is a discharge of capacitor 50 and this circuit can be traced from the positive side of capacitor 50, through inductor 56, through controlled rectifier 62, through inductor 86, through controlled rectifier 84 to junction 108. At this point, the capacitor discharge current takes two paths back to junction 67. One path is through conductor 106, an inductor 104, diode 98, controlled rectifier 44b and then through an inductor 72 to junction 67. The other path is a reverse current through controlled rectifier 42b and through conducting shut-off controlled rectifier 44b. The discharge of the capacitor reverse biases the controlled rectifier 42b to turn this controlled rectifier off and therefore opens the path from the power source that previously included controlled rectifier 40a, phase windings 14A and 14B and controlled rectifier 42b.

The last event that occurs is a reactive current flow which takes place due to the inductance of the windings 14A and 14B, the inductance of the leads and the inductance of the choke coils in the circuit when these windings are disconnected from the power source. When this happens, the polarity of the voltage across phase windings 14A and 14B reverses so that the junction 34 goes from a low voltage to a high voltage. One path for the reactive current can be traced from junction 34, through diode 92, through an inductor 93, through conductor 94, through junction 96 and then through the power controlled rectifier 40a to junction 32. The major portion of the reactive current flows through the path just described but a small part of the reactive energy is used to recharge the capacitor 50 to a polarity opposite from that shown in FIG. 2. This other path for reactive current is from junction 34, through controlled rectifier 44b, through controlled rectifier 60, through capacitor 50, through inductor 56, through controlled rectifiers 62 and 84, through battery 10, and then through controlled rectifier 40a to junction 32.

It should be mentioned that capacitor 50 discharges and then is recharged to a polarity opposite from that shown in FIG. 2 during the turn-off sequence of events for turning off controlled rectifier 42b. A small part of this current as just mentioned is reactive current but the majority of this current is supplied from battery 10 by the circuit through controlled rectifier 40a, phase windings 14A and 14B, controlled rectifier 44b, controlled rectifier 60, capacitor 50, inductor 56, controlled rectifier 62, inductor 86, controlled rectifier 84 and then back to the opposite side of the power source 10.

The series of events that have been described, of course, take place very rapidly and the net effect of these events is to turn off controlled rectifier 42b to therefore reduce the voltage in phase windings 14A and 14B at time $T_2$ indicated in FIG. 4. This turn-off event also charges the capacitor 50 to a polarity which is opposite from the charge it had just prior to the turn-off event.

In order to again energize phase windings 14A and 14B, the controlled rectifier 40a gated on by a pulse of voltage at time $T_3$ illustrated in FIG. 3.

It should be noted that the turn-on pulse for controlled rectifier 40a will not be required where controlled rectifier 40a is held on by reactive current flow where the pulses during a 60° period are close together. The pulse may be required where the power pulses have a wide spacing and is provided to make sure that controlled rectifier 40a is always gated on regardless of the condition of operation.

At this time, controlled rectifier 42b is gated back on so that motor current again flows through phase windings 14A and 14B from the source of direct current 10. This current continues to flow until time $T_4$ where controlled rectifiers 44b, 84, 64 and 66 are turned on. It will be observed that during this turn-off cycle as compared to time $T_2$, controlled rectifiers 64 and 66 are triggered conductive rather than controlled rectifiers 60 and 62 but controlled rectifiers 44b and 84 are again triggered conductive the same as for time $T_2$. The reason for triggering controlled rectifiers 64 and 66 rather than controlled rectifiers 60 and 62 is because of the change of polarity of capacitor 50.

At time $T_4$, the capacitor 50 discharges through a circuit that can be traced from junction 52, through controlled rectifier 66, through inductor 86, through controlled rectifier 84, through junction 108, through conductor 106, through inductor 104 and diode 98, through controlled rectifier 66, through inductor 86, through controlled rectifier 84, through junction 108, through conductor 106, through inductor 104 and diode 98, through controlled rectifier 44b, through conductor 110, through controlled rectifier 64 and then back to the opposite side of the capacitor 50 through inductor 56. This arrangement again turns off controlled rectifier 42b with the result that reactive current again flows and the same set of events occur that occurred at time $T_2$.

The controlled rectifiers 40a and 42b are gated back on at time $T_5$ and are gated off once more at time $T_6$ which corresponds to the set of events that occurred at time $T_2$.

The motor voltage wave shape for phase winding 14A over the set of switching events which has occurred during the first 60° of the cycle depicted in FIG. 3 is depicted in FIG. 4. It can be seen that at times $T_2$, $T_4$ and $T_6$ the circuit for the phase windings is opened resulting in a pulsating voltage depicted in FIG. 4. It will be appreciated from an inspection of FIGS. 3 and 4 that the motor current path comprising phase windings 14A and 14B has been turned on and off three times during the 60° cycle and that the phase windings A and B have both been energized for the 60° cycle. The turning on and off of the current path including phase windings 14A and 14B has controlled the amount of current supplied to the motor for a given portion of the fundamental frequency of the current supplied to the motor and is controlled in the system by voltage control 29. The extensions on the voltage pulses shown in FIG. 4 at a turn-off point indicate the voltage of the capacitor 50 which is added to the battery voltage at the instant of turn-off.

Figure 5:
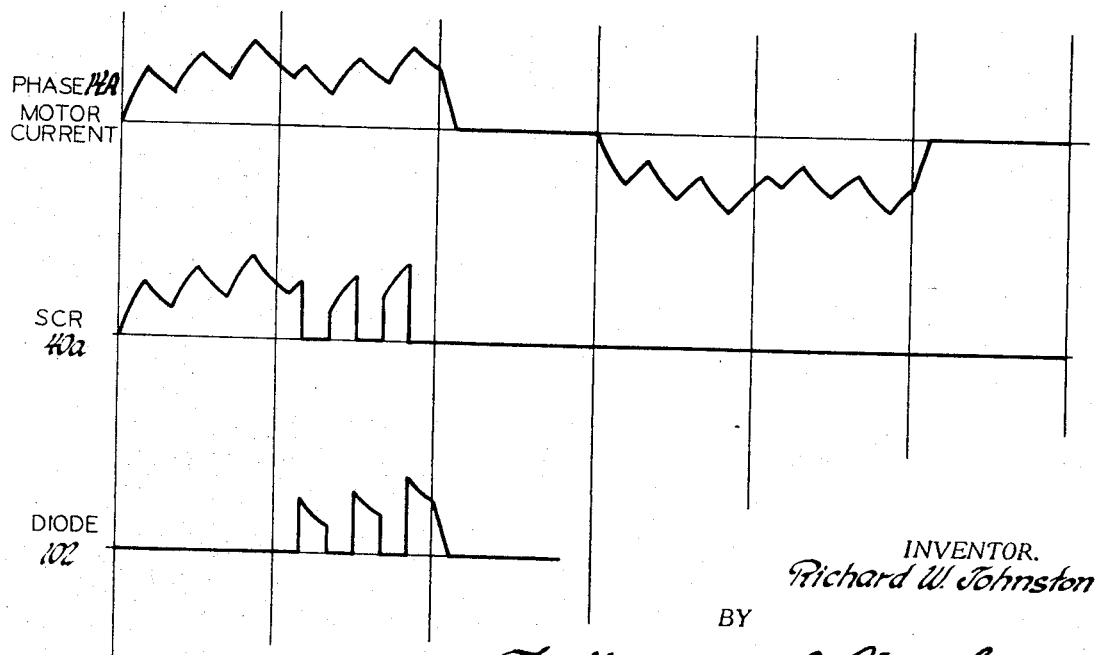
FIG. 5 illustrates the phase current of one phase of the motor winding and also illustrates the current through one controlled rectifier and one diode of the inverter illustrated in FIG. 2.

FIG. 5 illustrates the current developed in phase winding 14A for the same periods of time depicted in FIGS. 3 and 4. It will be observed that the current increases and decreases exponentially due to the reactive nature of the phase windings of the induction motor. The increasing slope of these curves indicates battery current while the decreasing slope indicates reactive current flow. The current curve progressively increases in FIG. 4 because the reactive current has not reached zero before the phase windings are again energized from the battery which causes battery and reactive current to add.

FIG. 5 illustrates the current through controlled rectifier 40a during the time periods depicted in FIGS. 3 and 4 and also illustrates the current through diode 102 during the time periods indicated in FIGS. 3 and 4.

The complete cycle of operation of the inverter shown in FIG. 2 will not be described in detail but the complete cycle is depicted by the pulse diagram of FIG. 3. Thus during the second 60° cycle, it can be seen that controlled rectifiers 40a and 42c are brought into operation with controlled rectifier 40a now being periodically switched off to control the amount of current being supplied to phase windings 14A and 14C. The current wave form for this 60° period is illustrated in FIG. 5 and the voltage for phase windings 14A and 14C is illustrated in FIG. 4. During this period of time, reactive current flows through diode 102 rather than through diode 92 which is due to the reactive current flowing through a circuit that can be traced from junction 36, through controlled rectifier 42c, junction 108, conductor 106, diode 102, and then back to phase winding 14A. This current through diode 102 is shown in FIG. 5 and it exists when controlled rectifier 40a is turned off. A similar current flow exists through diode 92 during the first 60° period depicted in FIGS. 3 and 4.

The current through the controlled rectifier 40a during the second 60° period is a pulsating current as indicated in FIG. 5 and this is due to the fact that this controlled rectifier is turned on and off during the second 60° period of the complete cycle of operation. The difference in the current wave shape through controlled rectifier 40a during the first and second 60° periods is the fact that controlled rectifier 40a handles motor and reactive current during the first 60° period but handles on a small reactive current added to battery current during the second 60° period where the reactive current at shut-off is handled by contolled rectifier 42c.

During the third 60° period illustrated in FIG. 4, the controlled rectifiers 40b and 42c are controlled to control current flow through phase windings 14B and 14C. It will be observed that during this period of time, the current through phase winding 14C has the same polarity as the second 60° period but the current flow through phase winding 14B is opposite to that which occurred during its first 60° period.

During the fourth 60° period, phase windings 14A and 14B are energized by controlling controlled rectfiers 42a and 40b.

During the fifth 60° period, the current through phase windings 14A and 14C is controlled by controlling the controlled rectifiers 42a and 40c. It will be observed that the same phase windings are energized during the fourth 60° period as were energized during the second 60° period with the exception that the polarity of the current is reversed.

During the final or the sixth 60° period, phase windings 14B and 14C are energized by controlling the controlled rectifiers 42b and 40c.

Following the final 60° period which completes one cycle of operation, the motor is again triggered beginning with the first 60° period at the frequency which is determined by a summation of motor speed and slip frequency signal.

It will be observed that the width of the series of voltage pulses applied to each phase winding during a 60° period as illustrated in FIG. 4 depends on the time period, for example, between pulses that occur at times $T_1$ and $T_2$ between times $T_3$ and $T_4$ and between times $T_5$ and $T_6$. The occurrence of the turn-off pulses, for example, at time $T_2$ can be controlled so as to control the pulse width shown in FIG. 4 by the logic system 22. In addition, the number of times that the controlled rectifiers are turned on and off during a given 60° period can also be varied by varying the number of pulses that occur during a given 60° period. For this reason, it is possible to obtain both pulse width and pulse frequency control of the amount of current supplied to the induction motor for any given 60° period by supplying proper information to the inverter from the logic system 22.

The fundamental frequency of the 60° periods is determined by the trigger information supplied to the inverter from the logic system 22 and this responds to a summation of motor speed and slip frequency signal. In this regard, the system is arranged such that a turn-off pulse is supplied at the end of each 60° period, if needed, and a turn-on pulse is supplied at the beginning of the next 60° period after a required dead time that is determined by logic 22. These turn-off pulses which occur at the end of each 60° period regardless of the voltage control to be achieved are not illustrated but they are provided by the logic system 22 if a turn-off pulse has not occurred due to voltage control just prior to the end of a 60° period. For the reasons stated, the fundamental frequency of the current supplied to the motor is determined by the logic system 22 and the amount of power supplied to the motor is controlled during each 60° period by the arrangement that has been described and under control of voltage control 29.

It will be observed from an inspection of FIG. 4 and from the previous description of the inverter shown in FIG. 2 that the controlled rectifier which is turned on and off during a given 60° period is the controlled rectifier which is in its last 60° period of control for a given 120° energization of a phase winding. To further explain this, it can be seen that between zero and 120°, the controlled rectifier 40a is pulsed during its last 60° period or between 60° and 120° since at the end of this period, current is switched from phase winding 14A to phase winding 14B. This sequence prevails for each phase winding and during the total 360° period. The reason for this sequence is to insure that there will be an absolute turn-off of a given phase during its last 60° period, that is, during the time that the current is being switched from one phase to the other, for example, between phases 14A and 14B at the 120° point.

It will also be observed that during the operation of the inverter shown in FIG. 2, one of the group of diodes 88–92 will be handling reactive current while one of the group of diodes 98–102 is handling shut-off current for the controlled rectifier that is to be turned off. Thus when controlled rectifier 42b is being turned on and off during the first 60°, diode 92 handles reactive current while diode 98 is handling shut-off current. This means that the diodes perform two functions in the system, namely, handling reactive current and also controlled rectifier shut-off current.

Figure 6:
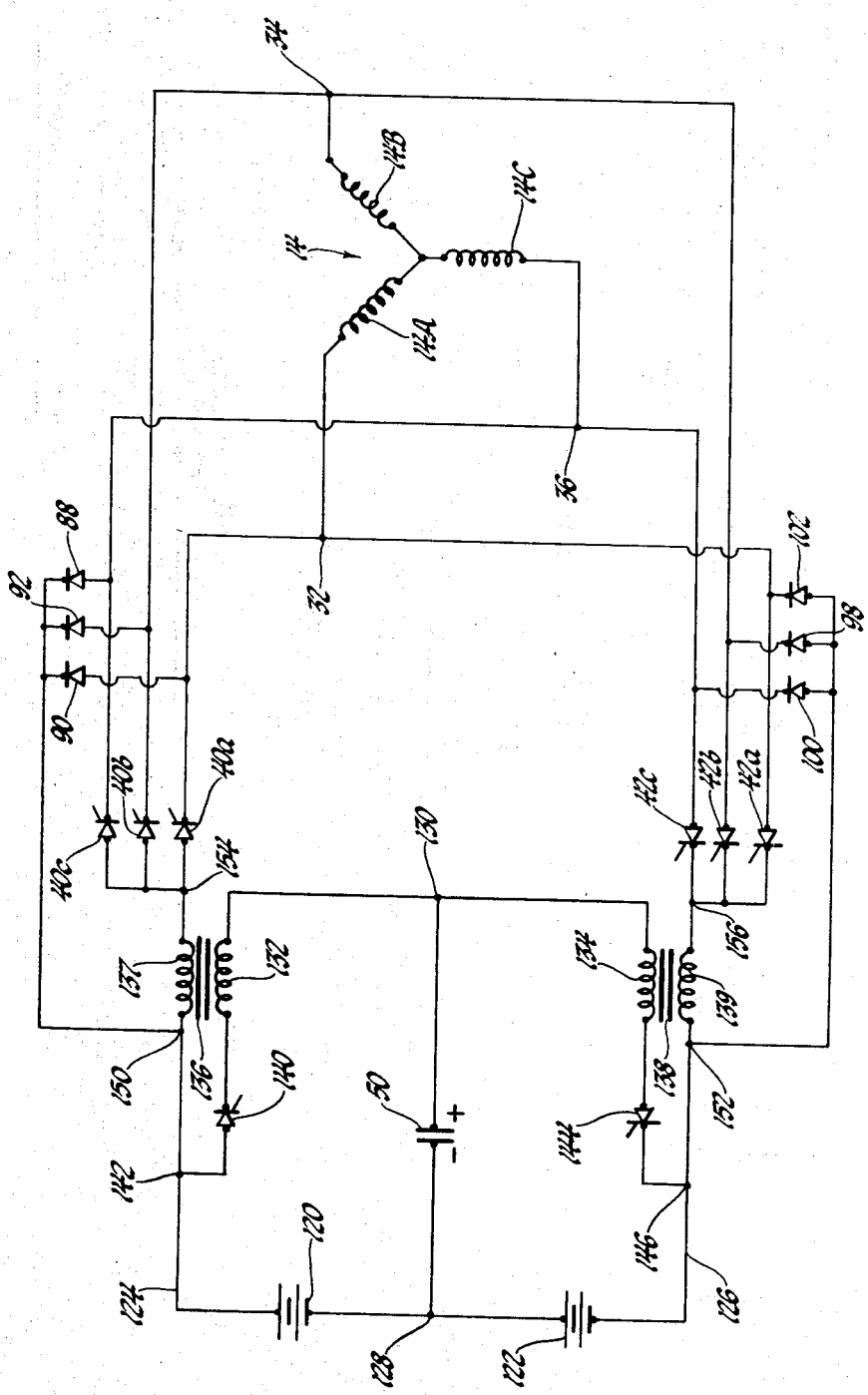
FIG. 6 illustrates an inverter utilizing transformer commutation which is capable of controlling the magnitude and frequency of the output current of the inverter that is supplied to an induction motor or other load.

Referring now more particularly to FIG. 6, a modified inverter is illustrated which can be utilized to modulate the current supplied to an induction motor and this inverter utilizes a combined capacitor discharge and transformer coupling type of turn-off arrangement for the power controlled rectifiers. In FIG. 6, the same reference numerals have been used as were used in FIG. 1 to identify corresponding circuit elements in each figure.

In the system of FIG. 6, the direct current is provided by two direct current sources 120 and 122 which are connected between power input lines 124 and 126. The power sources are connected together at junction 128 which is connected to one side of a commutating capacitor 50. The opposite side of the commutating capacitor 50 is connected with junction 130 and this junction is connected to one side of the primary windings 132 and 134 of transformers 136 and 138. A shut-off controlled rectifier 140 is provided which has its cathode connected to one side of the primary 132 and its anode connected to junction 142. A second shut-off controlled rectifier 144 is provided which has its anode connected to primary 134 and its cathode to junction 146. It is seen that the cathodes of the diodes 88–92 are connected with junction 150 while the anodes of diodes 98–102 are connected with junction 152. The secondary winding 137 of transformer 136 is connected between junctions 150 and 154. The junction 154 is connected with the anodes of power controlled rectifiers 40a, 40b and 40c. In a similar fashion, the secondary winding 139 of transformer 138 is connected between junctions 152 and 156, the junction 156 being connected with the cathodes of controlled rectifiers 42a, 42b and 42c.

In the operation of the system illustrated in FIG. 6 the phase windings of the induction motor are energized by periodically applying turn-on pulses to the power controlled rectifiers. When controlled rectifiers 40a and 42b are turned on, the phase windings 14A and 14B of the motor are connected across the power supply and are theerfore energized. When it is desired to turn off one of the controlled rectifiers, for example, controlled rectifier 42b, the shut-off controlled rectifier 144 is triggered to a conductive condition foming a discharge path for capacitor 50 in series with direct current source 122 and through primary winding 134 of transformer 138. The pulse of current that flows through primary winding 134 induces a voltage in secondary winding 139 which temporarily raises the cathode voltage of controlled rectifier 42b to a value sufficient to turn off this controlled rectifier. During this conduction period of shut-off controlled rectifier 144, the capacitor 50 will charge to a reverse polarity from that shown on the drawing. This means that if shut-off controlled rectifier 140 is now triggered, the capacitor will discharge through the controlled rectifier and primary winding 132 causing a voltage pulse to be induced in secondary winding 137 which lowers the voltage of the anode of controlled rectifier 40a to a point where this controlled rectifier is no longer conductive.

It can be seen from the foregoing, that each time a shut-off controlled rectifier 140 or 144 is fired, the capacitor discharges through one or the other of the primary windings 132 or 134 to turn off an associated power control rectifier and following this, the capacitor is charged to a reverse polarity and to the proper polarity for the next firing of one of the shut-off controlled rectifiers 140 or 144.

By providing proper trigger signals to the power controlled rectifiers and to the shut-off controlled rectifiers 140 and 144, it is possible to control both the frequency of the current supplied to the polyphase motor 14 and it is also possible to modulate the current supplied to the polyphase motor 14 in a similar manner to the modulation that takes place with the system of FIGS. 1 and 2. The system of FIG. 6 requires an odd number of pulses per 60° for proper control of the system.

The diodes 80–90 and 98–102 provide a path for reactive current when a controlled rectifier is turned off to open the circuit between the direct current source and the phase windings of the motor. The reactive path for current when controlled rectifiers 40a and 42b have been conducting and when 42b is then driven nonconductive can be traced from junction 34, through diode 92, through secondary 137, through controlled rectifier 40a and then to phase winding 14a via junction 32.

While the embodiments of the present invention as herein disclosed constitute a preferred form, it is to be understood that other forms might be adopted.

What is claimed is:

1. A polyphase inverter for supplying alternating current to an electrical load from a source of direct current comprising, a plurality of output terminals, a first group of power controlled rectifiers having their cathodes connected respectively with said output terminals, a second group of controlled rectifiers having their anodes connected respectively with said output terminals, the anodes of said first group of controlled rectifiers being connected with one input terminal of said inverter and the cathodes of said second group of controlled rectifiers being connected with the other input terminal of said inverter, a commutating capacitor, a bridge circuit comprised of four semiconductor switching devices having a pair of terminals connected with said capacitor through an inductor, a first semiconductor switching device connected between said bridge circuit and said first input terminal of said inverter, a second semiconductor switching device connected between said bridge circuit and the other input terminal of said inverter, a first group of shut-off controlled rectifiers having their cathodes connected respectively with the cathodes of said first group of power controlled rectifiers, means connecting the anodes of said first group of shut-off controlled rectifiers with one terminal of said bridge circuit, a second group of shut-off controlled rectifiers having their anodes connected with the anodes of said second group of power controlled rectifiers, the cathodes of said second group of shut-off controlled rectifiers being connected with another terminal of said bridge circuit, and means for simultaneously triggering a pair of semiconductor switches of said bridge circuit, one of said first and second semiconductor switching devices and one of said shut-off controlled rectifiers to a conductive condition to form a discharge path for said capacitor which is operative to reverse bias one of said power control rectifiers.

2. The inventor according to claim 1 where each of said power controlled rectifiers is shunted by a series-connected inductor and diode which is connected in series respectively with a shut-off controlled rectifier.

3. The inverter according to claim 1 where inductors are connected respectively in series with the shut-off controlled rectifiers between the shut-off controlled rectifiers and a terminal of the bridge.

4. A polyphase inverter for feeding a polyphase electrical load comprising, a plurality of output terminals for said inverter, a first group of controlled rectifiers each having an anode and a cathode, the anodes of said first group of controlled rectifiers connected respectively with the output terminals of the inverter, a second group of controlled rectifiers each having an anode and a cathode, the cathodes of said second group of controlled rectifiers connected respectively with the output terminals of said inverter, the cathodes and anodes of said groups of said controlled rectifiers connected respectively with input terminals for said inverter, a direct current power supply for said inverter including first and second sources of direct current having a first common junction, the potential of said first common junction being intermediate the potential of opposite sides of said direct current power supply, first and second transformers each having a primary winding and a separate secondary winding, means connecting the secondary windings of said transformers respectively between opposite sides of said direct current power supply and said input terminals of said inverter, a commutating capacitor, first and second shut-off semiconductor switches, means connecting said first shut-off semiconductor switch and one primary winding of one of said transformers between one side of said direct current power supply and a second junction, means connecting the other shut-off semiconductor switch and said other primary winding of said other transformer in series between said second junction and an opposite side of said direct current power supply, and means connecting said commutating capacitor directly between said first and second junctions, said capacitor discharging through one primary winding of one of said transformers when one of said shut-off semiconductor switches is gated conductive to provide a pulse of energy in a secondary winding which has a polarity to reverse bias the anode-cathode circuit of a controlled rectifier to bias it nonconductive, said semiconductor switch which is gated conductive providing a charging circuit for said capacitor after it discharges to charge it to a polarity opposite from its polarity just prior to its discharge, the charge and discharging circuits for said capacitor which includes said primary windings being separate from the circuits including said secondary windings for supplying current to said input terminals of said inverter from said direct current power supply whereby said primary windings do not carry load current.

References Cited
UNITED STATES PATENTS

| | | | |
|---|---|---|---|
| 3,219,905 | 11/1965 | Davis et al. | 321—45 X |
| 3,262,036 | 7/1966 | Clarke et al. | |
| 3,354,370 | 11/1967 | Corry et al. | 321—5 X |
| 3,399,336 | 8/1968 | Koppelmann | 321—5 |
| 3,406,325 | 10/1968 | Rosa | 318—227 X |

WILLIAM H. BEHA, Jr., Primary Examiner

U.S. Cl. X.R.

318—227; 321—45

PO-1050
(5/69)

UNITED STATES PATENT OFFICE
CERTIFICATE OF CORRECTION

Patent No. 3,543,131　　　　　Dated　November 24, 1970

Inventor(s)　　Richard W. Johnston

It is certified that error appears in the above-identified patent and that said Letters Patent are hereby corrected as shown below:

Column 1, lines 6 and 7, delete "Patent No. 3,477,002 dated Nov. 4, 1969" and insert -- abandoned --;
Column 1, lines 35 and 36, delete "now patent No. 3,477,002".
Column 7, line 2, after "40a" insert -- is --;
　　　　　lines 30-33, delete "66, through inductor 86, throu controlled rectifier 84, through junction 108, through conduc 106, through inductor 104 and diode 98, through controlled rectifier".
Column 10, line 13, delete "theerfore" and insert -- therefor
　　　　　　line 16, delete "foming" and insert -- forming --.
Column 11, line 22, delete "inventor" and insert -- inverter Signed and sealed this 26th day of October 1971.

(SEAL)
Attest:

EDWARD M. FLETCHER, JR.　　　　ROBERT GOTTSCHALK
Attesting Officer　　　　　　　　Acting Commissioner of Paten